United States Patent Office
3,557,176
Patented Jan. 19, 1971

3,557,176
PROCESS FOR THE PREPARATION OF ALKYLARYLDICHLOROSILANES
Andre Bazouin and Marcel Lefort, Caluire, France, assignors to Rhone-Poulenc S.A., Paris, France, a French body corporate
No Drawing. Filed Oct. 1, 1968, Ser. No. 764,293
Claims priority, application France, Oct. 2, 1967,
123,017
Int. Cl. C07f 7/12
U.S. Cl. 260—448.2
7 Claims

ABSTRACT OF THE DISCLOSURE

Alkylaryldichlorosilanes are produced by heating a dialkyldichlorosilane with a diaryldichlorosilane at 70° to 220° C. in the liquid phase in the presence of aluminum chloride.

The present invention relates to the preparation of alkylahyldichlorosilanes by a redistribution reaction between a diaryldichlorosilane and a dialkyldichlorosilane.

It is known to prepare alkylphenyldichlorosilanes by redistribution reactions which produce an exchange between a chlorine atom and aphenyl or alkyl radical in two different organosilanes. These reactions have been effected by heating mixtures comprising a dialkylchlorosilane and a phenylchlorosilane or an alkylphenylchlorosilane in the presence of aluminum chloride.

Such processes are only of limited value on an industrial scale because they employ starting materials which are difficult to obtain because they cannot be prepared in a simple manner by the processes usually employed in organosilicon chemistry.

Another process for the preparation of alkylphenyldichlorosilanes has been proposed by Rathousky et al. [Collection Czechoslov. Chem. Comm. 25 1807 (1960)]. This process consists of heating, in vapour phase at above 450° C., a mixture of diphenyldichlorosilane and a dialkyldichlorosilane in the presence of various complexes of aluminium chloride as catalyst. The fact that this process is carried out at very high temperatures and that low yields of alkylphenyldichlorosilanes are obtained make this process of little interest for use on an industrial scale.

It has now been found, and it is this which forms the subject of the present invention, that alkylaryldichlorosilanes may be produced in excellent yields by heating a diaryldichlorosilane with a dialkyldichlorosilane in the liquid phase in the presence of anhydrous aluminium chloride.

The diaryldichlorosilanes which may be used are preferably compounds of the formula:

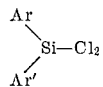
(I)

in which the symbols Ar and Ar', which may be identical or different, represent a phenyl radical which is unsubstituted or substituted by methyl, phenyl or a chlorine atom.

The dialkyldichlorosilanes which may be used may in general be represented by the formula:

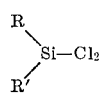
(II)

in which the symbols R and R', which are identical or different, represent lower alkyl (i.e. alkyl of 1 to 4 carbon atoms) radicals, preferably methyl or ethyl, unsubstituted or substituted by a chlorine atom.

Using diaryldichlorosilanes of Formula I in which Ar and Ar' are identical and dialkyldichlorosilanes of Formula II in which R and R' are identical makes it possible easily to obtain the alkylaryldichlorosilanes of the formula:

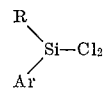

The mixture of the dichlorosilanes and the catalyst is heated in the liquid phase to a temperature of 70° to 220° C., preferably to 100°–180° C. Where the boiling point of the mixture is below the temperature selected for effecting the reaction, the latter may be effected in an apparatus which works under autogenous pressure. The mixture may also be kept in the liquid phase by introducing an inert gas such as nitrogen or carbon dioxide under superatmospheric pressure.

The amounts of diaryldichlorosilane and dialkyldichlorosilane employed may be equimolecular but it is preferable to use a molar excess of dialkyldichlorosilane of 20 to 100% relative to the diaryldichlorosilane.

The aluminium chloride may be used in a proportion of 0.1 to 10%, preferably 1 to 5% by weight, relative to the total weight of the dichlorosilanes employed. Aluminium chloride which is stored in the form of large lumps and finely ground just before use is preferably employed.

At the end of the period of heating, which may last from 1 to 30 hours depending on the temperature at which the reaction is effected and the nature of the starting reagents, the constituents of the final mixture may be separated by conventional methods, for example by distillation. In order to avoid aluminium chloride being entrained in the distillate it is advantageous to convert it into a complex before distillation, for example by adding an alkali metal halide such as sodium chloride.

The examples which follow illustrate the invention:

EXAMPLE 1

174.15 g. (1.35 mols) of dimethyldichlorosilane, 227 g. (0.9 mol) of diphenyldichlorosilane and 14.4 g. of powdered aluminium chloride are introduced into a 500 cm³. stainless steel autoclave. The mixture is heated to 150° C. for 3 hours. After cooling, the contents of the autoclave are transferred to a distillation apparatus and 10 g. of sodium chloride are added to the mixture. On distillation, 99 g. (0.768 mol) of dimethyldichlorosilane, and 64.5 g. (0.255 mol) of diphenyldichlorosilane are recovered unchanged, together with 170 g. of a fraction (B.P. 84–85° C./15 mm. Hg) containing 93.8% by weight of methylphenyldichlorosilane. The liquid byproducts recovered (56 g.) essentially consist of methyltrichlorosilane, phenyltrichlorosilane and diphenylmethylchlorosilane.

The yield of methylphenyldichlorosilane is 71.7% based on the dimethyldichlorosilane consumed and 64.7% based on the diphenyldichlorosilane consumed.

EXAMPLE 2

The procedure of Example 1 is followed using 139.3 g. (1.08 mols) of dimethyldichlorosilane and 12.5 g. of aluminium chloride. 70.5 g. (0.547 mol) of dimethyldichlorosilane and 71.4 g. (0.282 mol) of diphenyldichlorosilane are recovered unchanged, with 156.3 g. of a fraction (B.P. 86–88° C./16 mm. Hg) containing 92.3% by weight of methylphenyldichlorosilane. The yields as defined in Example 1 are 71% and 61.1% respectively.

EXAMPLE 3

The experiment described in Example 1 is repeated starting from 96.75 g. (0.75 mol) of dimethyldichlorosilane, 126.5 g. (0.5 mol) of diphenyldichlorosilane and 7.6 g. of aluminium chloride, and heating the mixture to 120° C. for 7 hours. 56 g. (0.434 mol) of dimethyldichlorosilane and 38.4 g. (0.152 mol) of diphenyldichlorosilane are recovered unchanged, together with 93.6 g. of a fraction containing 91% by weight of methylphenyldichlorosilane.

The yields relative to the dimethyldichlorosilane and the diphenylchlorosilane consumed are 70.5% and 64.1% respectively.

EXAMPLE 4

The process is carried out in the manner described in Example 1 starting from 235.5 g. (1.5 mols) of diethyldichlorosilane, 253 g. (1 mol) of diphenyldichlorosilane and 16.6 g. of aluminium chloride, with heating to 150° C. for 9 hours. 98 g. (1.025 mols) of diethyldichlorosilane and 123 g. (0.485 mol) of diphenyldichlorosilane are recovered unchanged, together with 136.5 g. of a fraction (B.P. 96–100° C./13 mm. Hg) containing 85.7% of ethylphenyldichlorosilane.

The yields are 60.2 and 56.6% relative to the diethyldichlorosilane and diphenyldichlorosilane consumed respectively.

EXAMPLE 5

The procedure of Example 1 is followed starting from 93.5 g. (0.723 mol) of dimethyldichlorosilane, 107.9 g. (0.38 mol) of di(p-tolyl)dichlorosilane and 6.8 g. of aluminium chloride with heating to 160° C. for 26 hours. After cooling, the contents of the autoclave are transferred into a distillation apparatus and 7 g. of sodium chloride are added to the mixture. On distillation, 59.6 g. (0.46 mol) of dimethyldichlorosilane and 26.7 g. (0.093 mol) of di-(p-tolyl)dichlorosilane are recovered unchanged, with 79.8 g. of a fraction (B.P. 113–115° C./17 mm. Hg) containing 94.5% by weight of methyltolyldichlorosilane.

The yields are 70.5 and 64.5% relative to the dimethyldichlorosilane and di(p-tolyl)dichlorosilane consumed respectively.

EXAMPLE 6

The procedure of Example 1 is followed starting from 97.8 g. (0.75 mol) of dimethyldichlorosilane, 161 g. (0.5 mol) of di(p-chlorophenyl)dichlorosilane and 12.95 g. of aluminium chloride with heating to 160° for 20 hours. After cooling, the contents of the autoclave are transferred into a distillation apparatus and 13 g. of sodium chloride are added to the mixture. On distillation, 61.5 g. (0.477 mol) of dimethyldichlorosilane and 66 g. (0.206 mol) of di(p-chlorophenyl)dichlorosilane are recovered unchanged, with 79.5 g. of a fraction (B.P. 128–129° C./17 mm. Hg) containing 81.5% by weight of methylchlorophenyldichlorosilane.

The yields are 52.2 and 48.6% relative to the dimethyldichlorosilane and di(p-chlorophenyl)dichlorosilane consumed respectively.

EXAMPLE 7

The procedure of Example 1 is followed starting from 96.8 g. (0.75 mol) of dimethyldichlorosilane, 146.6 g. (0.58 mol) of diphenyldichlorosilane and 2.45 g. of aluminium chloride, with heating to 150° C. for 13 hours. After cooling, the contents of the autoclave are transferred into a distillation apparatus and 2.45 g. of sodium chloride are added to the mixture. On distillation, 54.2 g. (0.42 mol) of dimethyldichlorosilane, and 39 g. (0.154 mol) of diphenyldichlorosilane are recovered unchanged with 93.8 g. of methylphenyldichlorosilane.

The yields are 74.3 and 57.7% relative to the dimethyldichlorosilane and diphenyldichlorosilane consumed respectively.

The alkylaryldichlorosilanes produced in accordance with the present process can be hydrolysed either by themselves or with other hydrolyzable organochlorosilanes to produce silicone oils, gums or resins. Thus, oily intercondensed diorganopolysiloxanes containing alkylarylsiloxy units can then be further condensed to high molecular weight products of gummy constitution. Such materials may, thereafter be compounded with various fillers, for instance silica aerogel, curing agents (e.g. 3,5-dichlorobenzoyl peroxide and hardened by heating at elevated temperatures, to give solid, elastic products having good resistance to heat at elevated temperatures while still remaining flexible at low tempeartures of about −50° C. or lower. Such silicone products can be employed as gaskets in both high temperature and low temperature applications. Oils prepared from the organochlorosilanes produced in accordance with the present process can be used as lubricants or employed with waxes and solvents to make silicone polishes.

We claim:

1. Process for the preparation of alkylaryldichlorosilanes or chloroalkylaryldichlorosilanes which comprises heating a dialkyldichlorosilane, the alkyl groups of which may be chlorine substituted, with a diaryldichlorosilane in the liquid phase at a temperature of 70° to 220° C. in the presence of anhydrous aluminium chloride.

2. Process according to claim 1 in which the alkyl groups in the dialkyldichlorosilane contain 1 to 4 carbon atoms each, and are unsubstituted or substituted by chlorine.

3. Process according to claim 1 in which the aryl groups in the diaryldichlorosilane are each phenyl, methylphenyl, phenylphenyl or chlorophenyl.

4. Process according to claim 1, in which the said mixture is heated to 100° to 180° C.

5. Process according to claim 1 in which a molar excess of 20% to 100% of the dialkyldichlorosilane relative to the diaryldichlorosilane is used.

6. Process according to claim 1 in which the proportion of aluminium chloride is 0.1 to 10% of the total weight of the said dichlorosilanes.

7. Process according to claim 6 in which the proportion of aluminium chloride is 1 to 5% of the total weight of the dichlorosilanes.

References Cited

UNITED STATES PATENTS

| | | |
|---|---|---|
| 2,730,540 | 1/1956 | Sauer. |
| 2,786,861 | 3/1957 | McEntee. |
| 2,888,478 | 5/1959 | Ashby. |
| 2,888,478 | 5/1959 | Ashby. |

TOBIAS E. LEVOW, Primary Examiner

P. F. SHAVER, Assistant Examiner